S. H. KEEFER.
FRICTION BRAKE.
APPLICATION FILED MAR. 24, 1910.
1,162,370.
Patented Nov. 30, 1915.
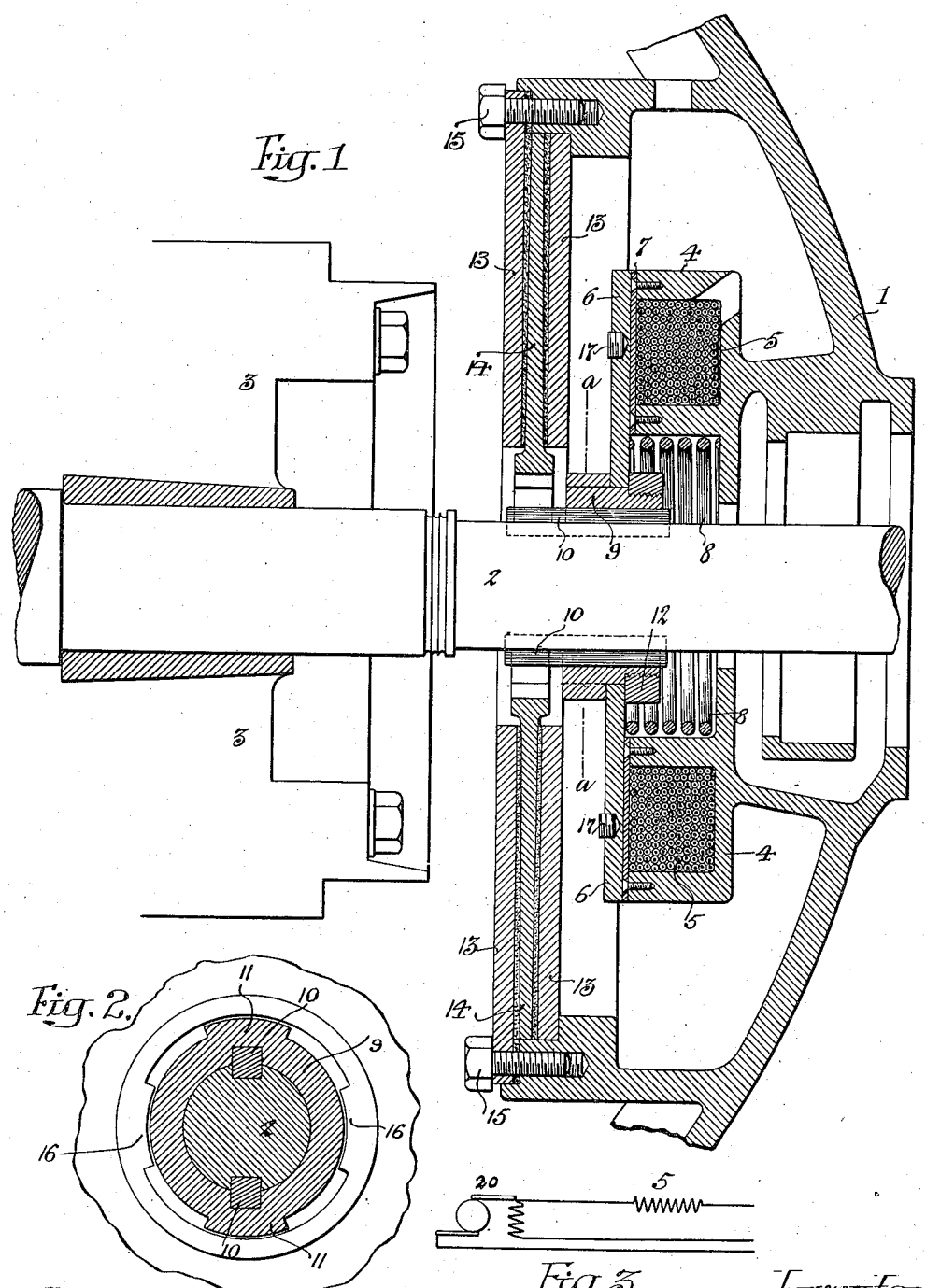
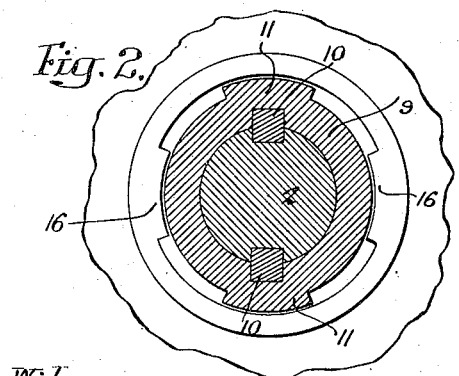

UNITED STATES PATENT OFFICE.

SAMUEL HINE KEEFER, OF PLAINFIELD, NEW JERSEY, ASSIGNOR TO NILES-BEMENT-POND COMPANY, OF JERSEY CITY, NEW JERSEY, A CORPORATION OF NEW JERSEY.

FRICTION-BRAKE.

1,162,370.   Specification of Letters Patent.   Patented Nov. 30, 1915.

Application filed March 24, 1910. Serial No. 551,356.

*To all whom it may concern:*

Be it known that I, SAMUEL H. KEEFER, a citizen of the United States, residing in Plainfield, county of Union, State of New Jersey, have invented certain Improvements in Friction-Brakes, of which the following is a specification.

The present invention has for an object the provision of an economical and reliable form of braking mechanism having its parts so arranged that under normal operating conditions neither of its co-acting braking members are in motion; the construction being such that only under conditions requiring the use of the brake, are these parts moved.

Another object of the invention is the provision of an efficient, easily constructed and durable brake, particularly adapted for application to a planer or other machine having a reciprocating part, which shall be of such a construction as to automatically come into operation to stop movement of such part when the driving mechanism ceases to act; as for example,—when the current is cut off from the driving motor.

A further object of the invention is to provide a friction brake whose co-acting friction surfaces shall have relative movement only at the time when said brake is actually in use to retard movement of the apparatus to which it is connected; the invention also contemplating a construction in which the moving parts actuated from the driving shaft, shall possess but relatively small mass and therefore have but little momentum.

Other objects will be in part obvious and in part pointed out hereinafter.

The invention accordingly consists in the features of construction, combinations of elements, and arrangements of parts which will be exemplified in the construction hereinafter set forth, and the scope of the application of which will be indicated in the following claims.

In the drawings, illustrating a preferred embodiment of the several features of the invention, Figure 1 is a vertical section of a brake constructed in accordance with my invention and applied to the armature shaft of an electric motor; Fig. 2, is a vertical section on the line *a—a*, Fig. 1, and Fig. 3, is a diagram showing one arrangement of electrical connections between my improved braking mechanism and the driving motor.

Similar reference characters refer to similar parts throughout the several views of the drawings.

Referring now to Fig. 1, there is represented at 1 a portion of the casing of an electric motor, one end of whose armature shaft is shown at 2, while the end of the armature is indicated at 3. Attached to the casing 1, either integrally or otherwise, and concentric with the shaft 2, is a fixed clutch member 4 having within it a winding 5, which with a plate 6 constitutes an electro-magnetic clutch. While said clutch may be of any desired suitable construction, the arrangement of the parts is such that one of its members,—in the present instance the casing 4 and the winding 5,—is rigidly connected to the stationary motor casing 1, while the iron or steel plate 6 forming the armature of the magnet is keyed or otherwise mounted upon the shaft 2 so as to be compelled to turn therewith while being free to move toward or from the casing 4 and its winding. Said winding has a protecting face plate 7 fastened to the casing 4 between it and the armature plate 6, and this latter is normally held away from the adjacent face of the stationary clutch member 4 by means of a spring 8 mounted within the said member, preferably concentric with the shaft 2.

For connecting the armature plate 6 with the shaft, there is provided a sleeve 9 slidably mounted on said shaft and held from turning by keys 10. Said sleeve, as shown in Fig. 2, is provided with teeth or projections 11 and is free to turn relatively to the armature plate 6 while being connected thereto by means of a nut 12.

The friction surfaces of the brake are provided in the present instance by a pair of annular plates 13 rigidly held to the stationary casing 1 and having interposed between them a third plate 14 formed with a central opening for the passage of the shaft 2. The two plates 13 are made to permanently clamp the plate 14 between them with any desired force by means of the bolts 15, whereby said plates 13 are held to the casing 1, so that by setting up these bolts or unscrewing them, the friction between the co-acting faces of the three plates and consequently the force retarding any revolution of the plate 14 may be varied to any desired extent. The central opening through this plate is substantially circular in outline, although said plate has inwardly extending projections or teeth 16; the various parts being so proportioned that the teeth or projections 11 of the sleeve 9 may enter the spaces between the teeth 16 and may co-act with said teeth to operatively couple together said sleeve and said plate. The plates 13 may, if desired, be made of iron or steel and the plate 14 of brass, or vice-versa, or if desired one plate or set of plates may have a suitable metal deposited electrolytically on its working face or faces.

When the various parts are at rest and the clutch winding 5 is deënergized, the spring 8 holds the armature plate 6 and with it the sleeve 9, away from the stationary clutch member 4, but since under operating conditions, the said winding is preferably connected in series with the armature of the motor 20 with which the device is used (Fig. 3) as soon as said motor is started said winding attracts to it the armature plate 6, so that when the shaft 2 turns, the sleeve 9 and said plate are the only parts of the apparatus which revolve. It is obvious that the winding may also be connected across the supply mains, i. e. in parallel with the motor. When, however, the current is cut off from the motor and hence from the clutch winding 5, or is cut off from said winding at the same time the motor circuit is opened, the spring 8 at once forces the plate 6 away from the member 4 and causes the teeth 11 of the sleeve 9 to enter the space between the teeth 16 and the plate 14, thereby coupling the shaft 2 and whatever mechanism is attached to it, to said plate. Since, however, the two plates 13 tightly grip between them the plate 14, a retarding force is at once exerted to prevent revolution of the plate 14 and shaft 2, which, with its attached mechanism, is very quickly brought to rest.

In order that the armature plate 6 may not stick to the plate 13, against which it might be forced by the spring, I provide two or more plugs 17 of brass or other non-magnetic material, preferably mounted in the face of said plate 6.

While the above described device is particularly useful for preventing drifting of a planer table when the power is cut off from the driving motor, it is obvious that it may be employed in other combinations without essential modification or departure from my invention.

It will be noted that the sleeve 9 is of relatively small mass, so that the momentum of the moving parts of the device is practically negligible, thereby making possible the stopping of said parts in a minimum time and with a minimum braking force.

It is obvious that where a great braking force is required, more than two plates 13 may be used and likewise a corresponding number of plates 14 may be alternated with said other plates.

While an electro-magnet is illustrated as the device whereby under certain conditions, one element of the braking device is caused to be connected to or disconnected from the shaft or machine whose movement is to be retarded, it is obvious other devices may be employed for performing this work without departing from my invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In a device of the character described, in combination, a motor comprising a shaft, braking means therefor comprising friction members and a clutch element, a second clutch element adapted to coact therewith to thereby cause said braking means to act upon said shaft, and electro-magnetic means mounted on the motor casing and adapted to actuate one of said clutch elements.

2. In a device of the character described, in combination, a motor comprising a shaft, braking means therefor comprising a plurality of movable and fixed friction members, one of said members being provided with a clutch element, said shaft being provided with a second clutch element adapted to coact with said first-mentioned clutch element, and electro-magnetic means mounted on the motor casing and adapted to control said second clutch element.

3. In a device of the character described, in combination, a motor comprising a shaft, friction braking means mounted adjacent said shaft, a clutch mounted on said shaft, and electro-magnetic means mounted on the motor casing and adapted to control the action of said clutch to thereby actuate said braking means.

4. In a device of the character described, in combination, a motor comprising a shaft, friction braking means mounted adjacent said shaft and provided with a clutch element, a second clutch element movably mounted upon said shaft, means mounted on the motor casing and adapted to move said last-mentioned clutch element into engagement with said clutch element associated with said braking means to thereby cause a braking action upon said shaft, and electro-magnetic means adapted to disengage said clutch elements.

5. In a device of the character described, in combination, a motor comprising a shaft, two engaged and normally stationary working plates, means for automatically connecting said shaft with one of said plates when it is desired to retard movement of the shaft, and an electro-magnet mounted on the casing and adapted to throw said connecting means out of connection.

6. In a device of the character described, in combination, a motor comprising a shaft, two permanently engaged and normally stationary friction plates, automatic means for connecting said shaft with one of said plates to cause braking action under predetermined conditions, and an electro-magnet device for normally maintaining said connecting means out of action.

7. The combination of a motor and braking means therefor including an electro-magnet having its winding in circuit with said motor; a plurality of normally stationary and permanently engaged braking structures; with means for automatically coupling one of said braking structures to the movable member of the magnet when the latter is deënergized.

8. The combination with an electric motor of an electro-magnet having its winding in series with said motor and its armature connected to a shaft driven by said motor; with braking means including two normally stationary and permanently engaged parts; and a device for connecting one of said parts to the shaft when current is cut off from the motor.

9. The combination of an electro-magnet having a fixed and a movable element; a member whose movement is to be retarded; two co-acting and normally stationary braking structures; and means connected to the movable magnet element for operatively coupling one of said braking structures and the movable member when the magnet is deenergized.

10. The combination of a plurality of engaged and normally stationary braking plates; a member whose movement is to be retarded under predetermined conditions; a structure possessing a relatively small mass for temporarily connecting said member with one of said braking plates when it is desired to retard movement of the member, and an electro-magnetic device for throwing said connecting structure out of action.

11. The combination of a plurality of frictionally engaged and stationary braking elements; a shaft connected to mechanism whose movement is to be retarded; an electro-magnet; with a member controlled by said magnet and possessing relatively small mass for temporarily connecting the shaft with one of the braking element.

12. The combination of a plurality of plates permanently held in frictional engagement with each other; a shaft connected to mechanism to be retarded; an electro-magnet having an armature plate; and means connected to said armature plate for operatively connecting said shaft and certain of said plate to cause them to rotate together.

13. The combination of a plurality of braking plates in permanent frictional engagement with each other; a shaft concentric with said plates; an electro-magnet having an armature plate; a sleeve attached to said plate and splined to said shaft; said sleeve being capable of connecting certain of the braking plates to the shaft; and a spring normally tending to force said sleeve into its connecting position.

14. The combination of a supporting structure; a plurality of braking plates in permanent frictional engagement with each other, of which one plate is fixed to said supporting structure and another plate is provided with clutch teeth; a shaft connected to the mechanism whose movement is to be retarded; a sleeve splined to said shaft and having teeth capable of co-acting with the teeth of said braking plate to couple the same to the shaft; an electro-magnet having a casing and a winding, fixed to the supporting structure and provided with an armature plate connected to the sleeve; with a spring acting in opposition to the winding of the magnet and tending to move the sleeve into its coupling position.

In testimony whereof, I have signed my name to this specification, in the presence of two subscribing witnesses.

SAMUEL HINE KEEFER.

Witnesses:
J. T. MacMurray,
C. W. Beiter.

It is hereby certified that in Letters Patent No. 1,162,370, granted November 30, 1915, upon the application of Samuel Hine Keefer, of Plainfield, New Jersey, for an improvement in "Friction-Brakes," an error appears in the printed specification requiring correction as follows: Page 2, claim 3, lines 119–121, after the words "adapted to" strike out all to the end of line 121 and insert the words *actuate said clutch to thereby control the action of said braking means.*; and that the said Letters Patent should be read with this correction therein that the same may conform to the record of the case in the Patent Office.

Signed and sealed this 11th day of January, A. D., 1916.

[SEAL.]

J. T. NEWTON,
*Acting Commissioner of Patents.*

Cl. 74—70.